United States Patent
Zikeli et al.

(10) Patent No.: US 7,025,926 B2
(45) Date of Patent: *Apr. 11, 2006

(54) METHOD FOR EXTRUDING A CONTINUOUS SHAPED BODY

(75) Inventors: Stefan Zikeli, Regau (AT); Friedrich Ecker, Timelkam (AT)

(73) Assignee: Zimmer A.G., Frankfurt am Main (DE)

( * ) Notice: Subject to any disclaimer, the term of this patent is extended or adjusted under 35 U.S.C. 154(b) by 331 days.

This patent is subject to a terminal disclaimer.

(21) Appl. No.: 10/296,336

(22) PCT Filed: Apr. 12, 2002

(86) PCT No.: PCT/EP01/04241

§ 371 (c)(1),
(2), (4) Date: Apr. 7, 2003

(87) PCT Pub. No.: WO01/90450

PCT Pub. Date: Nov. 29, 2001

(65) Prior Publication Data

US 2003/0193109 A1    Oct. 16, 2003

Related U.S. Application Data

(60) Provisional application No. PCT/EP01/04241, filed on Apr. 12, 2001.

(30) Foreign Application Priority Data

May 22, 2000    (DE) .................... 100 25 231

(51) Int. Cl.
B29C 47/00    (2006.01)
D01D 5/06    (2006.01)
D01D 5/12    (2006.01)
D01F 2/02    (2006.01)

(52) U.S. Cl. .............. 264/555; 264/187; 264/203; 264/210.8; 264/211.14

(58) Field of Classification Search ............ 264/187, 264/203, 210.8, 211.14, 555
See application file for complete search history.

(56) References Cited

FOREIGN PATENT DOCUMENTS

| WO | 97/24476 A1 | 7/1997 |
| WO | 98/26122 A1 | 6/1998 |
| WO | 99/47733 A1 | 9/1999 |

OTHER PUBLICATIONS

International Preliminary Examination Report, PCT/EP01/04241, Dec. 4, 2001.

*Primary Examiner*—Leo B. Tentoni
(74) *Attorney, Agent, or Firm*—McDonnell Boehnen Hulbert & Berghoff LLP

(57) ABSTRACT

The present invention relates to a method of producing a continuous molding making use of an extrusion solution containing preferably water, cellulose and a tertiary amine oxide. The extrusion solution is extruded through an extrusion-channel opening so as to form a continuous molding. The continuous molding is conducted through an air gap in which it is drawn. In order to increase the non-looping property and in order to reduce the fibrillation tendency, the present invention is so conceived that the mean acceleration and/or the mean heat flow density are controlled in accordance with predetermined formulae.

28 Claims, 1 Drawing Sheet

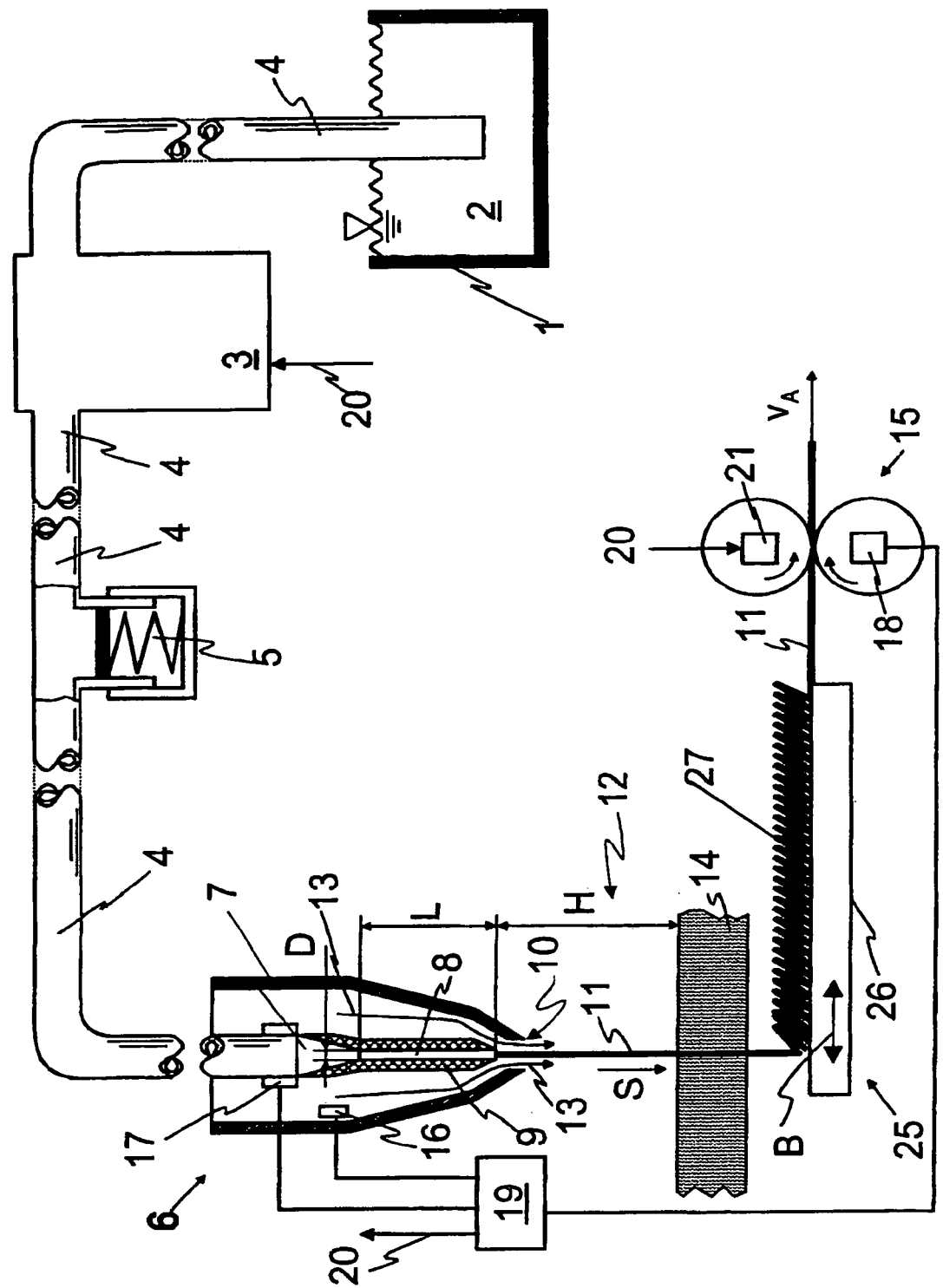

METHOD FOR EXTRUDING A CONTINUOUS SHAPED BODY

BACKGROUND OF THE INVENTION

The present invention relates to a method of extruding a continuous moulding making use of an extrusion solution, in particular an extrusion solution containing cellulose, water, tertiary amine oxide as well as additives for stabilizing the spinning dope and/or additives in the form of organic or inorganic additives, said method comprising the following steps:
- conducting the extrusion solution through an extrusion channel having a predetermined length and a predetermined diameter up to an extrusion-channel opening;
- extruding the extrusion solution through the extrusion-channel opening so as to form an extruded continuous moulding;
- conducting the extruded continuous moulding through an air gap having a predetermined air-gap height;
- accelerating the continuous moulding in the air gap.

The continuous mouldings produced by the above-mentioned method may have the shape of a thread, a filament or a film/foil. Especially in cases where a continuous moulding having the shape of a thread is produced, the above-mentioned method is used as a spinning method for producing a spinning thread.

The above-described method is known e.g. from U.S. Pat. No. 4,246,221. This reference describes the production of cellulose mouldings making use of spinning nozzles as extrusion-channel openings. The method executed in this reference is a method in which the spinning thread is conducted by means of air when it has left the spinning nozzle. The spinning thread is drawn in the air. This drawing is achieved by applying a mechanical drawing-off force by means of a draw-off member arranged after the spinning device.

AT-395863B describes a further method of producing a cellulose moulding. In the case of this method the height of the air gap is adjusted such that it is short. The diameters of the spinning-nozzle openings are between 70 and 150 micrometers in the case of this method, and the channel length of the spinning nozzles is between 1000 and 1500 micrometers. By reducing the height of the air gap and by using the special nozzle configurations, variations in titre as well as thread breaking and a conglutination of neighbouring threads is to be reduced.

SUMMARY OF THE INVENTION

These prior art methods for producing continuous mouldings are disadvantageous insofar as it is not possible to purposefully influence the properties of the continuous mouldings, especially their fibrillation tendency and their non-looping property.

It is therefore the object of the present invention to improve the known method of extruding a continuous moulding from an extrusion solution in such a way that the non-looping property is improved and the fibrillation tendency reduced.

According to the present invention, this object is achieved in the case of the method mentioned at the start by executing the following additional method step:
- controlling the acceleration $\bar{a}$ of the continuous moulding, which is averaged essentially over the air-gap height, to a value of $$\bar{a} = \frac{10}{\delta\left[\frac{1}{\beta}\right]^{0.3}},$$

wherein $\beta$ is the ratio of the length to the diameter of the extrusion channel and wherein the value of the control parameter $\delta$ is at least 0.3. The unit of the averaged acceleration $\bar{a}$ is $m/s^2$.

By means of this simple measure a good basic level can be achieved with regard to the non-looping property and the fibrillation tendency. The formulation acceleration averaged essentially over the air-gap height stands for an acceleration that is averaged over a substantial area of the distance which the extruded continuous moulding covers when moving through the air gap.

The values for the mechanical and textile-physical properties of the continuous moulding can be improved, when the value of the control parameter $\delta$ is at least 0.6 according to a further advantageous embodiment.

The textile properties of the continuous moulding can, surprisingly enough, be improved still further when the control parameter $\delta$ is at least 1.5 according to a further embodiment of the present method.

The lowest fibrillation tendency and the maximum non-looping property have been achieved with an embodiment of the present method in the case of which the value of the control parameter $\delta$ is at least 2.2.

According to an advantageous further development of the present method, a conveying means can be arranged after the air gap or after a coagulation bath, said conveying means conveying the continuous moulding to the draw-off unit in a substantially tensile stress-free manner. Also the conveying speed of this conveying means can be controlled in dependence upon said mean acceleration $\bar{a}$.

In accordance with a further advantageous embodiment, the extruded continuous moulding can be drawn off, when it has passed the air gap, by means of a draw-off unit in the case of the method according to the present invention. By means of the draw-off unit, the extruded continuous moulding is advanced under application of a tensile stress so that it can be subjected to further processing steps.

When a draw-off unit is used, the non-looping property can be improved and the fibrillation tendency reduced in accordance with an advantageous further development of the method according to the present invention, when the extrusion velocity $v_E$ of the continuous moulding, at which said continuous moulding is discharged from the extrusion-channel opening, and/or the drawing-off velocity $v_A$, at which the continuous moulding is drawn off by the draw-off unit, is/are controlled in dependence upon the acceleration $\bar{a}$.

The extrusion velocity and/or the drawing-off velocity can especially be controlled according to the following formula:

$$v_A^2 - v_E^2 = \gamma \cdot H \cdot \bar{a},$$

wherein H is the air-gap height and $\gamma$ a correction factor having a value between 7 and 7.4, preferably 7.2. The units are m/min for $v_A$ and $v_E$, mm for H and $m/s^2$ for $\bar{a}$.

When the continuous moulding is drawn in the air gap by means of air flowing substantially parallel to the extrusion direction of the continuous moulding at a velocity exceeding the extrusion velocity, the acceleration $\bar{a}$ in the air gap can also be adjusted by controlling the velocity of the air.

The acceleration $\bar{a}$ can be controlled by controlling an arbitrary combination of the extrusion velocity, the drawing-off velocity, the conveying speed of the conveying means and the flow velocity of the air.

The parameter β, which stands for the ratio of the length of the extrusion channel to the diameter of the extrusion channel, may be at least 2. Particularly good values for the non-looping property and the fibrillation tendency can be obtained when the value of β is at most 150. The mechanical properties can be improved when the value of β is at most 100.

For stabilizing the continuous moulding after the extrusion and after the acceleration, i.e. the drawing, the continuous moulding can be wetted in a coagulation bath after having passed the air gap. The wetting can especially be carried out by spraying liquid onto the continuous moulding by means of a wetting device or by immersing the continuous moulding into a coagulation bath.

The method referred to at the start can be improved still further by carrying out the following additional method step:
controlling the heat flow density, which is essentially averaged over the air-gap height, to a value of $$Q = \frac{0.004}{\alpha \cdot \left[\frac{1}{\beta}\right]^{0.3}}$$

wherein β is the ratio of the length to the diameter of the extrusion channel and the value of the control parameter α is at least 0.1, and wherein the value Q is calculated in W/mm³.

Also by means of this additional simple measure a good basic level can be achieved with regard to the non-looping property and the fibrillation tendency. The formulation heat flow density averaged essentially over the air-gap height stands for a heat flow density that is averaged over a substantial area of the distance which the extruded continuous moulding covers when moving through the air gap.

The mechanical properties of the continuous moulding can be improved, when the value of the control parameter α is at least 0.2 in accordance with a further advantageous embodiment.

The textile properties of the continuous moulding can, surprisingly enough, be improved still further, when the control parameter α is at least 0.5 according to a further embodiment of the present method.

The lowest fibrillation tendency and the maximum non-looping property have been achieved in accordance with an embodiment of the present method in the case of which the value of the control parameter α is at least 1.0.

In order to control the heat flow density in the air gap, the temperature of the continuous moulding, the temperature of the air surrounding the continuous moulding in the air gap, or a flow velocity of this air can be changed. The heat flow density in the air gap increases in response to a decrease in the air temperature and an increase in the air velocity as well as an increase in the temperature of the continuous moulding. In this respect, it must be taken into account that the adjustment of the air velocity will also influence the degree of drawing.

In accordance with a further advantageous embodiment of the present method, the heat flow density Q in the air gap can be adjusted especially by the following measure:
controlling a temperature difference $\Delta T = T_E - T_L$ between the temperature $T_E$ of the extrusion solution and the temperature $T_L$ of the air to a value of:

$$\Delta T = \frac{H}{d} \cdot \frac{0.004}{\dot{m} \cdot c_E \cdot \alpha \cdot \left[\frac{1}{\beta}\right]^{0.3}}$$

wherein $\dot{m}$ is the mass flow of the extrusion solution through the extrusion-channel opening in g/s, $c_E$ is the specific heat capacity of the extrusion solution in J/gK, d is the hole density of the holes provided on the nozzle disk in hole/mm², and H is the length of the air gap in mm.

When this kind of control is executed, either the temperature $T_E$ of the extrudate or the temperature $T_L$ of the air supplied in the air gap can be controlled and adjusted, or both said quantities can be controlled and adjusted simultaneously.

In addition, also all the other factors referred to in the formulaic relationship can be used for controlling the spinning process.

According to an advantageous embodiment, the specific heat capacity $c_E$ of the extrusion solution can be at least 2.1 J/(g K), and at most 2.9 J/(g K).

According to a further embodiment, the present method may comprise the following additional method step:
drawing the extruded continuous moulding when it has left the extrusion-channel opening in the air gap by means of an airflow flowing around the extruded continuous moulding in the direction of extrusion, the flow velocity of the air exceeding the extrusion velocity of the continuous moulding.

In this step, the polymer molecules of the continuous moulding are aligned by the drawing process. By means of the airflow, the tensile force required for the drawing is applied carefully from the circumferential surface of the continuous moulding. The airflow simultaneously cools the continuous moulding by dissipating heat.

When the continuous moulding is drawn in the air gap by means of air flowing substantially parallel to the extrusion direction of the continuous moulding at a velocity exceeding the extrusion velocity, the acceleration ā in the air gap can also be adjusted by controlling the velocity of the air.

In the following, the method according to the present invention will be described with the aid of an embodiment making reference to the drawing enclosed in which:

FIG. 1 shows a device for carrying out the method according to the present invention.

To begin with, the sequence of method steps of the method according to the present invention will be described making reference to FIG. 1.

In a reaction vessel 1 an extrusion solution 2 is prepared. The extrusion solution contains cellulose, water and a tertiary amine oxide, e.g. N-methylmorpholine-N-oxide (NMMO) and, if desired, stabilizers for thermally stabilizing the cellulose and the solvent. Stabilizers can e.g. be the following substances: propyl gallate, alkaline reacting media or mixtures thereof. If desired, further additives may be contained, such as titanium oxide, barium sulphate, graphite, carboxymethylcelluloses, polyethylene glycols, chitin, chitosan, alginic acid, polysaccharides, colorants, chemicals having an antibacterial effect, flameproofing agents containing phosphorus, halogens or nitrogen, activated carbon, carbon blacks or electrically conductive carbon blacks, silicic acids as well as organic solvents as diluting agents, etc.

A pump 3 is used for conveying an extrusion solution 2 through a system of conduits 4.

In said system of conduits 4 a pressure-compensating vessel 5 is arranged, which compensates pressure variations and/or variations of the volumetric flow rate in the system of conduits 4 so that an extrusion head 6 can be supplied with the extrusion solution 2 continuously and uniformly.

The system of conduits 4 is provided with temperature adjustment means (not shown) with the aid of which the temperature of the extrusion solution 2 can be controlled precisely. This is necessary since the chemical and the mechanical properties of the extrusion solution are strongly temperature dependent. The viscosity of the extrusion solution 2, for example, decreases as the temperature and the shear rate increase.

The system of conduits 4 has additionally provided therein burst-protection means, which are necessary due to the fact that the extrusion solution shows a tendency towards a spontaneous exothermic reaction. The burst-protection means prevent the system of conduits 4 and the pressure-compensating vessel 5 as well as the subsequent extrusion head 6 from being damaged.

A spontaneous exothermic reaction in the extrusion solution 2 will occur if a certain temperature is exceeded and if the extrusion solution 2 ages preferably in dead water regions. In order to avoid the latter, the system of conduits 4 is implemented such that advantageous flow conditions prevail in the area through which the highly viscous extrusion solution 2 flows.

In the extrusion head 6 the extrusion solution is distributed in a nozzle chamber 7 to a large number of extrusion channels 8 in the form of spinning capillaries. The spinning capillaries 8 are arranged in a row, in FIG. 1 at right angles to the plane of projection. On the basis of this arrangement, a large number of continuous mouldings is produced simultaneously by one extrusion head 6. It is also possible to provide a large number of extrusion heads 6 so that a plurality of rows of spinning capillaries exists.

The spinning capillaries have an internal diameter D of less than 500 micrometers, preferably less than 250 micrometers. For special cases of use, the diameter may also be less then 100 micrometers, preferably approx. 50 to 70 micrometers.

The spinning-capillary length L through which the extrusion solution flows is at least twice as long and at most 100 to 150 times as long as said internal diameter D.

The spinning capillary 8 is, at least in certain sections thereof, surrounded by a heating means 9 with the aid of which the wall temperature of the spinning capillary 8 can be controlled. The wall temperature of the spinning capillary 8 is approximately 150° C. The temperature of the spinning dope is approximately 100° C. The spinning capillaries 8 may also be arranged in an arbitrary form in a support member, which is temperature controlled from outside, so that high hole densities are obtained.

The heating means 9 extends preferably up to the extrusion-channel discharge opening 10 located in the direction of flow S. The wall of the extrusion channel 8 is heated up to the extrusion-channel opening 10 in this way.

Due to the heating of the extrusion channel, a heated film flow having a low viscosity in comparison with the core flow will form on the inner wall of the extrusion channel in view of the temperature-dependent viscosity of the extrusion solution. This will positively modify the velocity profile of the extrusion solution within the extrusion channel 8 and the extrusion process in such a way that an improved non-looping property and a reduced fibrillation tendency are achieved in comparison with the prior art.

The extrusion solution is extruded in the extrusion channel 8 whereupon it is discharged in the form of a spinning thread 11 into an air gap 12. The air gap 12 has a height H in the direction of flow S of the extrusion solution.

In the extrusion head 6, air 13 is conducted along the continuous moulding 11 coaxially with the extrusion solution at a high velocity. The flow velocity of the air 13 may be higher than the extrusion velocity $v_E$ of the spinning thread with which the continuous moulding is discharged from the extrusion-channel opening 10. This has the effect that a tensile stress by means of which the continuous moulding 11 can also be drawn acts on the boundary surface between the continuous moulding 11 and the air 13.

After having passed the air gap 12, the continuous moulding enters a coagulation bath zone 14 in which it is wetted with a coagulation solution. The wetting can be carried out either by means of a spray or wetting device (not shown) or, alternatively, the continuous moulding 11 can also be immersed in a coagulation bath. The extrusion solution is stabilized by means of the coagulation solution.

After the coagulation bath zone 14, the continuous moulding 11 is drawn off by means of a draw-off unit 15 at a drawing-off velocity $v_A$, whereupon it is subjected to further processing steps which are not shown here. Various additional processing means may be provided between the coagulation bath zone 14 and the draw-off unit 15. The continuous moulding 11 can, for example, be washed and pressed.

For extruding the extrusion solution, said extrusion solution has been heated to a temperature at which it is viscous and can therefore be extruded through the extrusion channel 8 and the extrusion-channel opening 10 in a shape-retaining manner. After the extrusion, the continuous moulding 11 must be cooled down in the air gap 12. For this purpose, a heat flow directed from the continuous moulding 11 into the air gap 12 must be built up.

The mechanical properties of the continuous moulding 11 depend on the method steps executed immediately before or immediately after the extrusion to a decisive extent.

The non-looping property of the continuous moulding can e.g. be improved and the fibrillation tendency can be reduced, when the heat flow density Q in the air gap is controlled to a value of $$Q = \frac{0.004}{\alpha \cdot \left[\frac{1}{\beta}\right]^{0,3}}$$

wherein β is the ratio of the length L to the diameter D of the extrusion channel 8 and the value of the control parameter α is at least 0.1.

The parameter β=L/D can assume values between 2 and 150, preferably values between 50 and 100.

In the above formula, α is a control parameter whose value is at least 0.1. In a further variant, the value of the control parameter α can be at least 0.2. Preferably, the control parameter α is at least 0.5, and according to a specially preferred embodiment it is at least 1.

The heat flow density Q represents a value of the heat flow in $W/mm^3$ per unit volume of the air gap space, said value being essentially averaged over the height H of the air gap 12. The heat flow density is the amount of heat introduced by the spinning dope into the air gap space which directly surrounds the filament. The air gap space has associated therewith a respective extrusion-channel opening 10 and is defined by a balance volume V surrounding the continuous moulding 11 in the air gap 12. In the air gap space V, the heat flow introduced by the continuous moulding 11 is balanced with the heat escaping from the air gap space. In this heat balance, the heat dissipated from the continuous mouldings leaving the balance volume and from the standing or moving air 13, which surrounds the continuous moulding 11 in the air gap 12, as well as the radiated heat have to be taken into account as negative heat flows.

In the case of extrusion or spinning heads 6 provided with a large number of neighbouring extrusion channels 8, the balance volumes of the individual extrusion channels 8 border on one another so that the heat flows of the individual continuous mouldings 11 influence one another. The mutual influence of the closely juxtaposed continuous mouldings is taken into account in the process control according to the present invention.

The heat flow density Q is essentially determined by the air temperature as well as by the temperature of the continuous moulding and by the amount of heat introduced by the continuous moulding. In the present embodiment, the temperature difference $\Delta T = T_E - T_L$ between the temperature $T_E$ of the extrusion solution and the temperature $T_L$ of the air is therefore adjusted to a value of:

$$\Delta T = \frac{H}{d} \cdot \frac{0.004}{\dot{m} \cdot c_E \cdot \alpha \cdot \left[\frac{1}{\beta}\right]^{0.3}}$$

wherein $\dot{m}$ is the mass flow of the extrusion solution through the extrusion-channel opening in g/s, $c_E$ is the specific heat capacity of the extrusion solution in J/gK, d is the hole density of the extrusion-channel openings per unit area in hole/mm$^2$ and H is the length of the air gap 12 in mm.

Either the temperature $T_E$ of the continuous moulding 11 or the temperature $T_L$ of the air 13 can be controlled, or both temperatures can be controlled simultaneously.

In addition, also all the other factors referred to in the formulaic relationship can be used for controlling the spinning process.

In addition to the heat flow density or instead of the heat flow density, the mean acceleration $\bar{a}$ of the continuous moulding 11 in m/s$^2$ in the air gap 12 can be adjusted such that it has the following value:

$$\bar{a} = \frac{10}{\delta \left[\frac{1}{\beta}\right]^{0.3}}$$

wherein $\beta$ is the ratio of the length to the diameter (L/D) of the extrusion channel 8. The quantity $\delta$ is a control parameter whose value is at least 0.3. In a further variant, the value of the control parameter $\delta$ can be at least 0.6. Preferably, the control parameter $\delta$ is at least 1.5, and according to a specially preferred embodiment it is at least 2.2.

The mean acceleration of the continuous moulding 11 in the air gap 12 is the acceleration averaged over a substantial part of the air-gap height H.

The acceleration $\bar{a}$ can be adjusted by changing the flow velocity of the air 13, by changing the extrusion velocity $v_E$ of the extrusion solution 2 at the extrusion-channel opening 10 or by changing the drawing-off velocity $v_A$ of the draw-off unit 15. Arbitrary combinations of the adjustments of these velocities are possible as well.

For detecting the flow velocity of the air 13, a sensor 16 can be provided. Likewise, a sensor 17 can be provided for detecting the extrusion velocity $v_E$, and a sensor 18 can be provided for detecting the drawing-off velocity $v_A$. The sensors 16, 17, 18 output signals, the respective signals being representative of the velocities measured by said sensors. These signals are supplied in the form of electrical signals to a controller 19, which processes these signals and outputs a control signal 20. This control signal 20 can be supplied to the pump 3 so as to adjust the extrusion velocity $v_E$ of the spinning material supplied to the extrusion head 6. The sensor 17 can also be used in combination with a precision spinning pump (not shown) which is integrated in the extrusion head 6. The control signal 20 may, however, also be supplied to a motor 21 used for driving the draw-off unit 15, so as to adjust the drawing-off velocity $v_A$. Finally, the control signal 20 can also be supplied to an air-supply means (not shown) so as to adjust the velocity of the air 13. In this way, a feedback control circuit for closed-loop control of the acceleration $\bar{a}$ can be established.

The extrusion velocity $v_E$ can be controlled independently of or together with the drawing-off velocity $v_A$. In the case of the embodiment according to FIG. 1, a change-over between a control of the extrusion velocity $v_E$ alone, of the drawing-off velocity $v_A$ alone and of a combined control of both velocities can be effected in such a way that the following formula is fulfilled:

$$v_A^2 - v_E^2 = \gamma \cdot H \cdot \bar{a},$$

wherein H is the air-gap height and $\gamma$ is a correction factor having a value between 7 and 7.4. The value of the correction factor can, in particular, be 7.2.

In the embodiment, a further conveying means 25 is shown between the air gap 12 or rather the coagulation bath zone 14 and the draw-off unit 15. This optional conveying means 25 conveys the continuous moulding to the draw-off unit 15 in a substantially tensile stress-free manner.

For this purpose, a conveying means in the form of an oscillating or vibrating conveyor 25 can be used, in the case of which the continuous moulding 11 is conveyed carefully by oscillating movements B of a support and transport surface 26.

The conveying speed of the conveying means 25 is substantially lower than the extrusion velocity $v_E$ or the drawing-off velocity $v_A$, which are approximately equal. Hence, the conveying means 25 acts as a buffer on which the continuous moulding 11 is deposited in a geometrically ordered, stacked form 27 before it is drawn off by the draw-off unit 15. Via respective sensors (not shown) also the conveying speed of the conveying means 25 can be controlled in dependence upon the mean acceleration $\bar{a}$ in the air gap.

Due to the tensile stress-free conveying of the continuous moulding 11 in this area, in which said continuous moulding stabilizes after having been extruded, the non-looping property is increased once more and the fibrillation tendency is substantially reduced.

The invention claimed is:

1. A method of extruding a continuous moulding making use of an extrusion solution, comprising:
   conducting the extrusion solution through an extrusion channel having a predetermined length and a predetermined diameter up to an extrusion-channel opening;
   extruding the extrusion solution through the extrusion-channel opening so as to form an extruded continuous moulding;

conducting the extruded continuous moulding through an air gap having a predetermined air-gap height;
accelerating the continuous moulding in the air gap; wherein:
the continuous moulding, is accelerated to a controlled value of $$\bar{a} = \frac{10}{\delta \cdot \left[\frac{1}{\beta}\right]^{0.3}}$$

averaged essentially over the air-gap height (H), wherein β is the ratio of the length (L) to the diameter (D) of the extrusion channel and wherein the value of the control parameter δ is at least 0.3.

2. The method according to claim 1, wherein the value of the control parameter δ is at least 0.6.

3. The method according to claim 2, wherein the value of the control parameter δ is at least 1.5.

4. The method according to claim 3, wherein the value of the control parameter δ is at least 2.2.

5. The method according to claim 1, wherein:
the continuous moulding has an extrusion velocity $v_E$ through the extrusion-channel opening that is controlled in dependence upon $\bar{a}$.

6. The method according to claim 1, wherein:
the extruded continuous moulding is conveyed in a substantially tensile stress-free manner on a conveying means to a draw-off unit, said conveying means being arranged after the air gap or a coagulation bath zone.

7. The method according to claim 6, wherein:
the conveying means has a conveying speed that is controlled in dependence upon $\bar{a}$.

8. The method according to claim 1, wherein:
the extruded continuous moulding, when it has passed the air gap, is drawn by means of a draw-off unit at a drawing-off velocity $v_A$.

9. The method according to claim 8, wherein:
the draw-off unit has a drawing off velocity that is controlled in dependence upon the mean acceleration $\bar{a}$.

10. The method according to claim 1, wherein:
the continuous moulding has an extrusion velocity $v_E$ through the extrusion-channel opening and/or a drawing-off velocity $v_A$ by the draw-off unit that is controlled according to the following formula:

$$v^2_A - v^2_E = \gamma \cdot H \cdot \bar{a}$$

wherein H is the air-gap height and γ is a correction factor having a value between 7 and 7.4.

11. The method according to claim 10, wherein the value of the correction factory γ is approx. 7.2.

12. The method according to claim 1, wherein:
the extruded continuous moulding when it has left the extrusion-channel opening in the air gap is drawn by means of an airflow flowing around the continuous moulding in the direction of extrusion, the flow velocity of the air exceeding the extrusion velocity of the continuous moulding.

13. The method according to claim 12, wherein:
the velocity of the air is controlled in dependence upon the mean acceleration $\bar{a}$ in the air gap.

14. The method according to claim 1, wherein:
the heat flow density Q, which is essentially averaged over the air-gap height, is controlled to a value of $$Q = \frac{0.004}{\alpha \cdot \left[\frac{1}{\beta}\right]^{0.3}}$$

wherein β is the ratio of the length to the diameter of the extrusion channel and wherein the value of the control parameter α is at least 0.1.

15. The method according to claim 14, wherein the value of the control parameter α is at least 0.2.

16. The method according to claim 15, wherein the value of the control parameter α is at least 0.5.

17. The method according to claim 16, wherein the value of the control parameter α is at least 1.0.

18. The method according to claim 14, wherein:
the temperature $T_E$ of the extrusion solution is controlled in dependence upon the heat flow density Q.

19. The method according to claim 14, wherein:
the air surrounding the continuous moulding in the air gap has a temperature that is controlled in dependence upon the heat flow density Q.

20. The method according to claim 1 wherein:
a temperature difference $\Delta T = T_E - T_L$ between the temperature $T_E$ of the extrusion solution and the temperature $T_L$ of the air surrounding the continuous moulding in the air gap is controlled to a value of:

$$\Delta T = \frac{H}{d} \cdot \frac{0.004}{\dot{m} \cdot c_E \cdot \alpha \cdot \left[\frac{1}{\beta}\right]^{0.3}}$$

wherein m is the mass flow of the extrusion solution through the extrusion-channel opening in g/s, $c_E$ is the specific heat capacity of the extrusion solution in J/(g K), d is the hole density of the holes provided on the nozzle disk in hole/mm$^2$ and H is the length of the air gap in mm.

21. The method according to claim 14, wherein the temperature $T_L$ is controlled while the temperature $T_E$ is kept substantially constant.

22. The method according to claim 14, wherein the temperature $T_E$ is controlled while the temperature $T_L$ is kept substantially constant.

23. The method according to claim 1, wherein the value β is at least 2.

24. The method according to claim 21, wherein the value β is at most 150.

25. The method according to claim 22, wherein the value β is at most 100.

26. The method according to claim 1, wherein the specific heat capacity $c_E$ of the extrusion solution is at least 2.1 J/(g K).

27. The method according to claim 1, wherein the specific heat capacity $c_E$ of the extrusion solution is at least 2.9 J/(g K).

28. The method according to claim 1, wherein the extrusion solution contains cellulose, water and a tertiary amino oxide.

* * * * *